US009725788B2

United States Patent
Ott et al.

(10) Patent No.: US 9,725,788 B2
(45) Date of Patent: Aug. 8, 2017

(54) RECOVERING HEAVY RARE EARTH METALS FROM MAGNET SCRAP

(71) Applicant: Iowa State University Research Foundation, Inc., Ames, IA (US)

(72) Inventors: Ryan T. Ott, Ames, IA (US); Ralph W. McCallum, Ames, IA (US); Lawrence L. Jones, Des Moines, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 214 days.

(21) Appl. No.: 14/545,994

(22) Filed: Jul. 15, 2015

(65) Prior Publication Data

US 2016/0362766 A1     Dec. 15, 2016

Related U.S. Application Data

(60) Provisional application No. 61/999,230, filed on Jul. 21, 2014.

(51) Int. Cl.
| | |
|---|---|
| *C22B 59/00* | (2006.01) |
| *C22B 7/00* | (2006.01) |
| *C22B 9/00* | (2006.01) |
| *C22B 23/02* | (2006.01) |
| *C22C 1/02* | (2006.01) |
| *C22C 19/00* | (2006.01) |
| *C22C 28/00* | (2006.01) |
| *C22C 33/04* | (2006.01) |
| *C22B 9/02* | (2006.01) |
| *C22B 23/00* | (2006.01) |

(Continued)

(52) U.S. Cl.
CPC ............. *C22B 59/00* (2013.01); *B01D 3/10* (2013.01); *B01D 7/00* (2013.01); *B22D 7/005* (2013.01); *C22B 7/001* (2013.01); *C22B 7/006* (2013.01); *C22B 9/003* (2013.01); *C22B 9/02* (2013.01); *C22B 9/103* (2013.01); *C22B 23/00* (2013.01); *C22C 1/02* (2013.01); *C22C 19/007* (2013.01); *C22C 28/00* (2013.01); *C22C 33/04* (2013.01); *F27D 11/06* (2013.01); *Y02P 10/214* (2015.11)

(58) Field of Classification Search
CPC    C22B 59/00; C22B 7/001; C22B 9/02; C22B 9/103; C22B 23/02; C22C 1/02; C22C 19/007; C22C 28/00; C22C 33/04
See application file for complete search history.

(56) References Cited

U.S. PATENT DOCUMENTS

| | | | |
|---|---|---|---|
| 4,767,455 A | * | 8/1988 | Jourdan ................ C22C 33/003 420/416 |
| 5,129,945 A | | 7/1992 | Lyman ............................ 75/416 |

(Continued)

FOREIGN PATENT DOCUMENTS

| | | |
|---|---|---|
| EP | 2684971 | 1/2014 |
| JP | 02-080530 | 3/1990 |
| JP | 2014-051731 | 3/2014 |

*Primary Examiner* — George Wyszomierski
*Assistant Examiner* — Tima M McGuthry Banks

(57) ABSTRACT

A method of treating rare earth metal-bearing permanent magnet scrap, waste or other material in a manner to recover the heavy rare earth metal content separately from the light rare earth metal content. The heavy rare earth metal content can be recovered either as a heavy rare earth metal-enriched iron based alloy or as a heavy rare earth metal based alloy.

17 Claims, 5 Drawing Sheets

(51) Int. Cl.
*B01D 3/10* (2006.01)
*B01D 7/00* (2006.01)
*B22D 7/00* (2006.01)
*C22B 9/10* (2006.01)
*F27D 11/06* (2006.01)

(56) References Cited

U.S. PATENT DOCUMENTS

| | | | |
|---|---|---|---|
| 5,238,489 A | 8/1993 | Lyman | 75/743 |
| 5,437,709 A | 8/1995 | Ellis | 75/581 |
| 2003/0106615 A1* | 6/2003 | Hirota | C22B 7/002 148/101 |
| 2011/0023660 A1 | 2/2011 | Okabe | 75/392 |
| 2013/0283977 A1 | 10/2013 | Lakshmanan | 75/743 |
| 2014/0291161 A1* | 10/2014 | Awazu | C25C 3/34 205/348 |
| 2014/0356258 A1* | 12/2014 | Miyata | C22B 59/00 423/21.1 |
| 2015/0104361 A1* | 4/2015 | Boudreault | C22B 3/42 423/21.5 |

\* cited by examiner

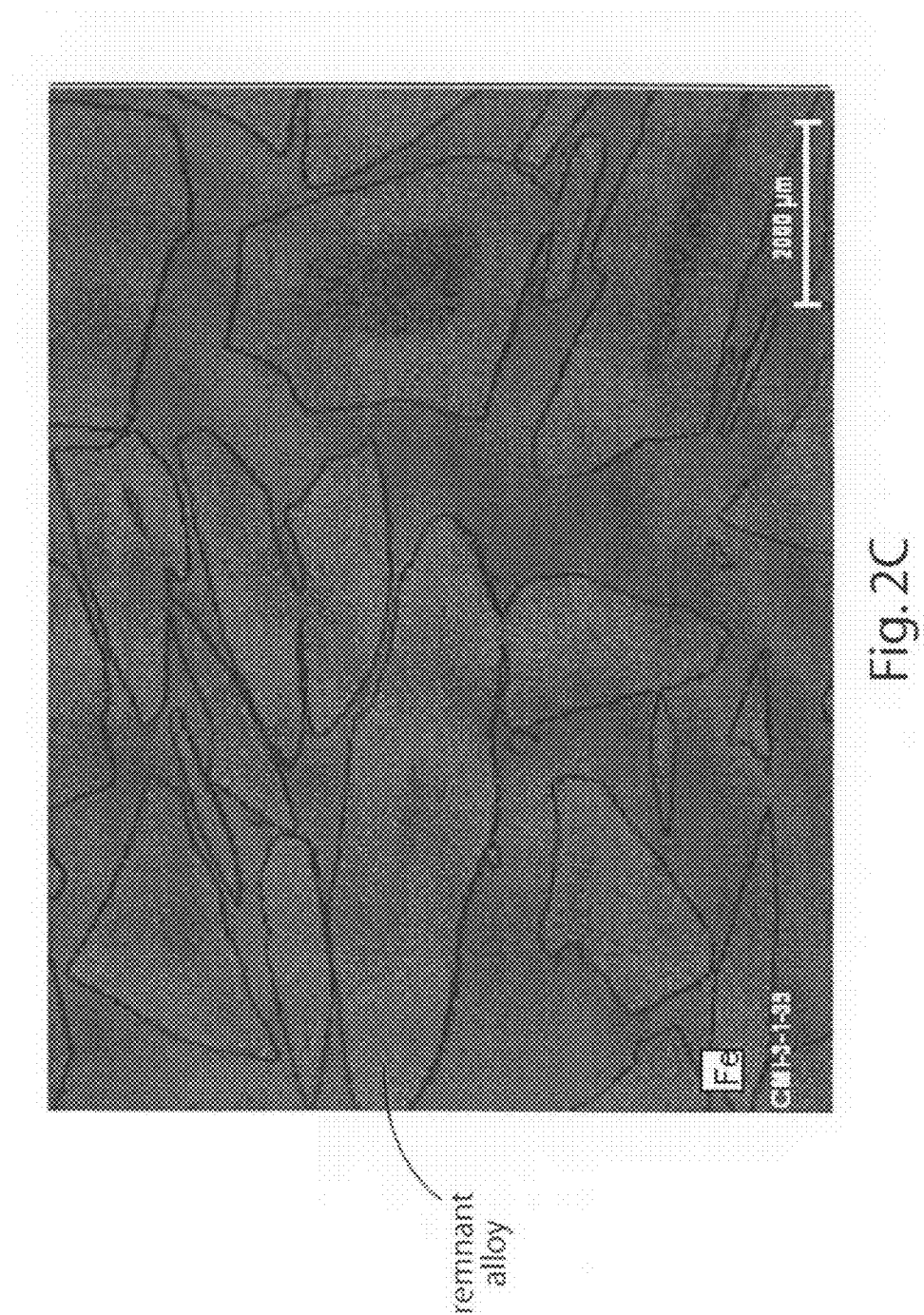

RECOVERING HEAVY RARE EARTH METALS FROM MAGNET SCRAP

RELATED APPLICATION

This application claims benefit and priority of U.S. provisional application Ser. No. 61/999,230 filed Jul. 21, 2014, the entire disclosure of which is incorporated herein by reference.

CONTRACTUAL ORIGIN OF THE INVENTION

This invention was made with government support under Grant No. DE-AC02-07CH11358 awarded by the U.S. Department of Energy. The government has certain rights in the invention.

FIELD OF THE INVENTION

The present invention relates to a liquid metal extraction treatment of rare earth metal-bearing permanent magnet scrap, waste or other material to recover the heavy rare earth metal content separately from the light rare earth metal content of the scrap.

BACKGROUND OF THE INVENTION

As a result of the expanding use of rare earth-bearing materials in modem technology, such as, for example, in the form of rare earth-iron alloy magnetostrictive transducers, delay lines, variable frequency resonators and filters and rare earth-iron-boron alloy permanent magnets, the cost and environmental problems associated with their waste and scrap disposal have become an increasing concern. Additionally, the high cost of rare earth metals makes simple disposal of rare earth-bearing waste or scrap materials economically unattractive. Up to the present time, there have been no large scale operations to recover rare earth metals from scrap and waste materials.

One attempt at recovering rare earth metals from waste and scrap involves dissolution of the waste/scrap material in acid media followed by precipitation of a rare earth compound. The rare earth compound is converted to a rare earth trifluoride which is then reduced to rare earth metal by calcium reduction. U.S. Pat. No. 5,129,945 describes a recovery process of this type. Although the recovery process is effective, it is time consuming and requires the use of expensive non-recoverable reagents.

Another attempt at recovering rare earth metals from rare earth-transition metal materials has produced a process that promises to be less costly and more adaptable to a variety of scrap materials. This process is based on liquid-liquid or liquid-solid extraction technology depending upon the specific rare earth alloy scrap being processed. The process allows rare earth recovery without the expensive and time consuming acid digestion and fluoride reduction steps employed in the recovery process described in the preceding paragraph. Rare earth metals are recovered in this process using reagents which are essentially completely recycled. Thus, the waste stream is kept to a minimum. U.S. Pat. No. 5,238,489 describes a recovery process employing a combination of leaching and flotation to separate different rare earth scrap alloys in a scrap mixture from one another.

U.S. Pat. No. 5,437,709 describes a liquid metal extraction treatment of rare earth-transition metal alloy scrap, waste or other material to rare earth metal components, wherein the process recovers the light rare earth metal and heavy rare earth metal contents of the scrap together. The patent is silent as to how to recover the heavy rare earth metal content separately from the light rare earth metal content of the scrap.

Since Dy is generally considered the most critical, as defined by reserves and costs of the rare earth metals used in $RE_2Fe_{14}B$ (where RE = a rare earth metal), development of a process that permits separation of Dy or other heavy rare earth metals from Nd and Pr (light rare earth metals) in their metallic states from permanent magnet scrap is highly desirable to help address potential shortages of Dy. A separation process that yields the heavy rare earth metal content in its metallic form also is preferred over separating processes that separate rare earth metals in their oxide forms, which requires further complicated chemical processing.

SUMMARY OF THE INVENTION

The present invention provides a method of treating rare earth metal-bearing permanent magnet scrap, waste or other material in a manner to recover the heavy rare earth metal content separately from the light rare earth metal content. The heavy rare earth metal content can be recovered either as a heavy rare earth metal-enriched remnant alloy or as a heavy rare earth metal-based alloy depending upon processing.

An illustrative embodiment of the invention involves treating a rare earth metal-bearing scrap particulate material that comprises a transition metal (e.g. Fe) a light rare earth metal (e.g. Nd and/or Pr) and a heavy rare earth metal (e.g. Dy and/or Tb). The method involves melting an extractant, such as, for example, including, but not limited to, Mg, Ca, Ba, or other Group IIA metal and contacting the extractant and the scrap material in a processing vessel at a first temperature. The light rare earth metal rapidly diffuses out of the scrap material and is soluble in the extractant at the first temperature as compared to the heavy rare earth metal which exhibits substantially less diffusivity and solubility at the first temperature. The first temperature is below the liquidus temperature of the rare earth-bearing material. The solid rare earth-bearing scrap material and the melted extractant are contacted at the first temperature for a time to thereby selectively extract the majority or most of the light rare earth metals from the rare earth-bearing material into the melted extractant. The resulting melted extractant containing the light rare earth metals forms a first extractant alloy that is separated, for example, by being cast and solidified in a mold, from a remnant alloy that remains in the processing vessel and comprises the transition metal (e.g. Fe, Co, and/or Ni) and the heavy rare earth metal.

The first extractant alloy is subjected to vacuum distillation or sublimation to recover the light rare earth metals as a result of selective removal of the extractant (e.g. Mg). The heavy rare earth metal-containing remnant alloy can be subjected to vacuum distillation or sublimation to remove any inter-particle extractant (e.g. Mg) and then to magnetic separation to separate from any residual light rare earth metals present in the inter-particle extractant. The heavy rare earth metal-containing remnant alloy provides a high-value product for reuse in manufacture of permanent magnets.

The heavy rare earth-enriched remnant alloy optionally can be further treated with extractant at a second higher controlled temperature where the heavy rare earth metal(s) exhibits more diffusivity out of the scrap material and solubility in the melted extractant to separate and recover the heavy rare earth metal(s) as a second extractant alloy (heavy rare earth metal/Mg alloy). The heavy rare earth metal then can be separated from the second extractant alloy by vacuum sublimation or vacuum distillation as a heavy rare earth-based alloy for recycling of the heavy rare earth metal and reuse of the extractant in the treatment process.

The present invention is useful, although not limited to, treating rare earth-iron based alloy permanent magnet scrap or waste material to extract the heavy rare earth metal content (e.g. typically Dy, Tb, and Ho and also Er, Tm, Th, Yb, Lu and Y if present) separately from the light rare earth metal content (e.g. typically Nd, Pr, and Gd and also La, Ce, Pm, Sm, Eu, and Sc if present). For purposes of illustration and not limitation, the invention can be used to treat permanent magnet scrap compositions that comprise $RE_2Fe_{14}B$ (where RE=one or more a rare earth metals) that contain various amounts of Nd, Pr, and Dy as well as other compositions containing heavy rare earth metal(s).

The present invention will become more readily understood from the following detailed description taken with the drawings.

BRIEF DESCRIPTION OF THE DRAWINGS

FIG. 1A shows a processing vessel (e.g. a steel crucible) loaded with liquid magnesium extractant and a mesh box containing permanent scarp pieces to be treated to recover the rare earth contents thereof and FIG. 1B shows a cast ingot.

FIGS. 2A, 2B, and 2C are X-ray spectrometer micrographs of the microstructure of the remnant alloy where lighter areas represent enrichment (higher concentrations) of Nd (FIG. 2A), Dy (FIG. 2B), and Fe (FIG. 2C).

DESCRIPTION OF THE INVENTION

Figure 1A:
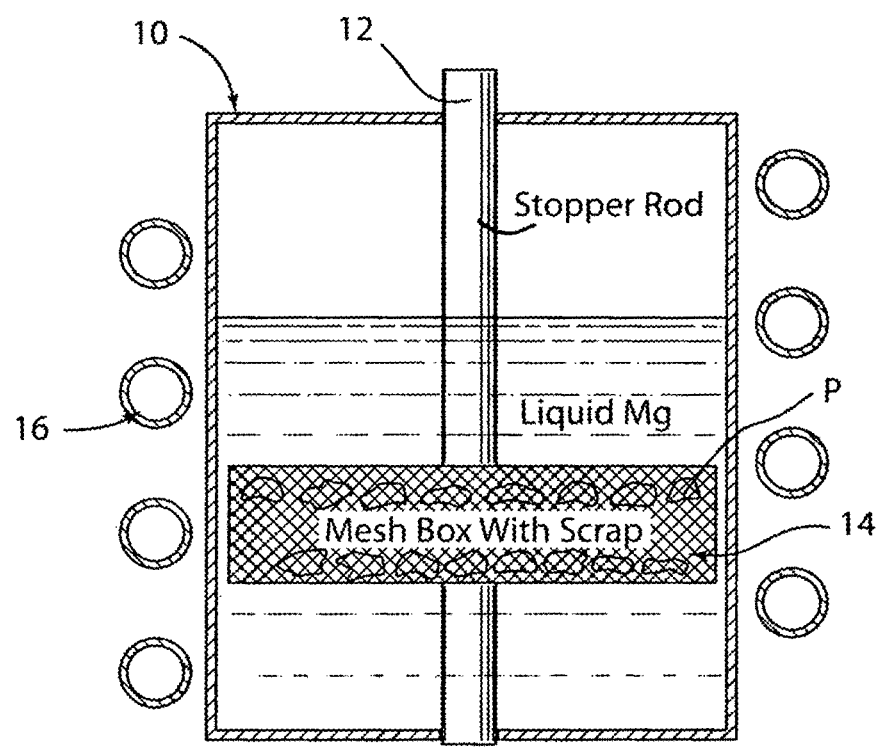
FIGS. 1A and 1B are schematic views of apparatus useful for practicing an embodiment of the invention where

The present invention involves a liquid metal extraction technique for treating rare earth metal-bearing permanent magnet scrap, waste, and other material to recover one or more heavy rare earth metals separately from one or more light rare earth metals for reuse.

Rare earth-bearing scrap or waste material typically will comprises scrap or waste generated by one or more fabricating operations, either on-site or off site. The scrap or waste may optionally be segregated (graded) by the alloy composition; size, shape, and other factors. For example, fine pyrolytic rare earth-transition metal dust or powder (referred to as swarf) of like or similar composition can be segregated for treatment whereas. dry, bulky scrap or waste pieces of the same or similar composition can be segregated into one or more groups by size and shape for treatment.

Swarf typically will comprise fine powder or particulates in the particle size range of less than 50 microns produced by such fabrication operations as abrasive cutting and grinding. Both swarf and bulky scrap or waste pieces may be treated in the as-received condition; i.e. without cleaning. If desired, bulky scrap pieces optionally may be ground in suitable manner into particulates form (e.g. particle sizes less than 500 microns) to improve dissolution kinetics during treatment.

Although not so limited, the present invention can be used to treat a wide variety of binary, ternary, and other rare earth-transition metal alloy compositions. For purposes of illustration and not limitation, rare earth-transition metal scrap, waste and other material (e.g. $Nd_2Fe_{14}B$, $SmCo_5$, $Dy_{0.25}Tb_{0.75}Fe$, etc.) treatable in accordance with the invention typicall will comprise one or more transition metals such as Fe, Co, Ni, etc., one or more rare earth metals such as Nd, Dy, Tb, Pr, Sm, Ho, La, Ce, Eu, Gd, Er, Tm, Th, Lu, Y, and Sc, and other optional alloyants, such as B, Zn, Nb, Ga Al as well as other non-metallics and metallics that may be used for one reason or another in the alloy composition.

The rare earth metal-bearing scrap, waste and other material may include a mixture of the different rare earth transition metal alloy scrap or waste materials (i.e. having different compositions) resulting, for example, from fabrication operations used to form permanent magnets and other articles of manufacture. An illustrative mixed rare earth metal-bearing material might include, for example, $Nd_2Fe_{14}B$ permanent magnet scrap or waste particulates, $SmCo_5$ permanent magnet scrap or waste. particulates, and SiC and/or $Al_2O_3$ particulates grinding media. Such a mixture of scrap and waste particulates typically is received covered with residual.watersoluble organic oils and/or coolant which are employed in the previous fabrication operations (e.g. abrasive grinding and cutting). Such mixtures of scrap and waste material can be cleaned prior to the liquid metal extraction treatment pursuant to the present invention, although cleaning is optional in practicing the invention.

Liquid metal extractants useful in practicing the present invention preferably are selected from the Group IIA metals of the Periodic Table including, but not limited to, Mg, Ca, Ba, and others in which the rare earth metal(s) to be recovered is/are soluble in the molten extractant under appropriate temperature and contact time parameters. The temperature and time parameters can be controlled depending upon the composition of the rare earth-bearing material being treated and of the liquid metal extractant used.

Figure 1B:
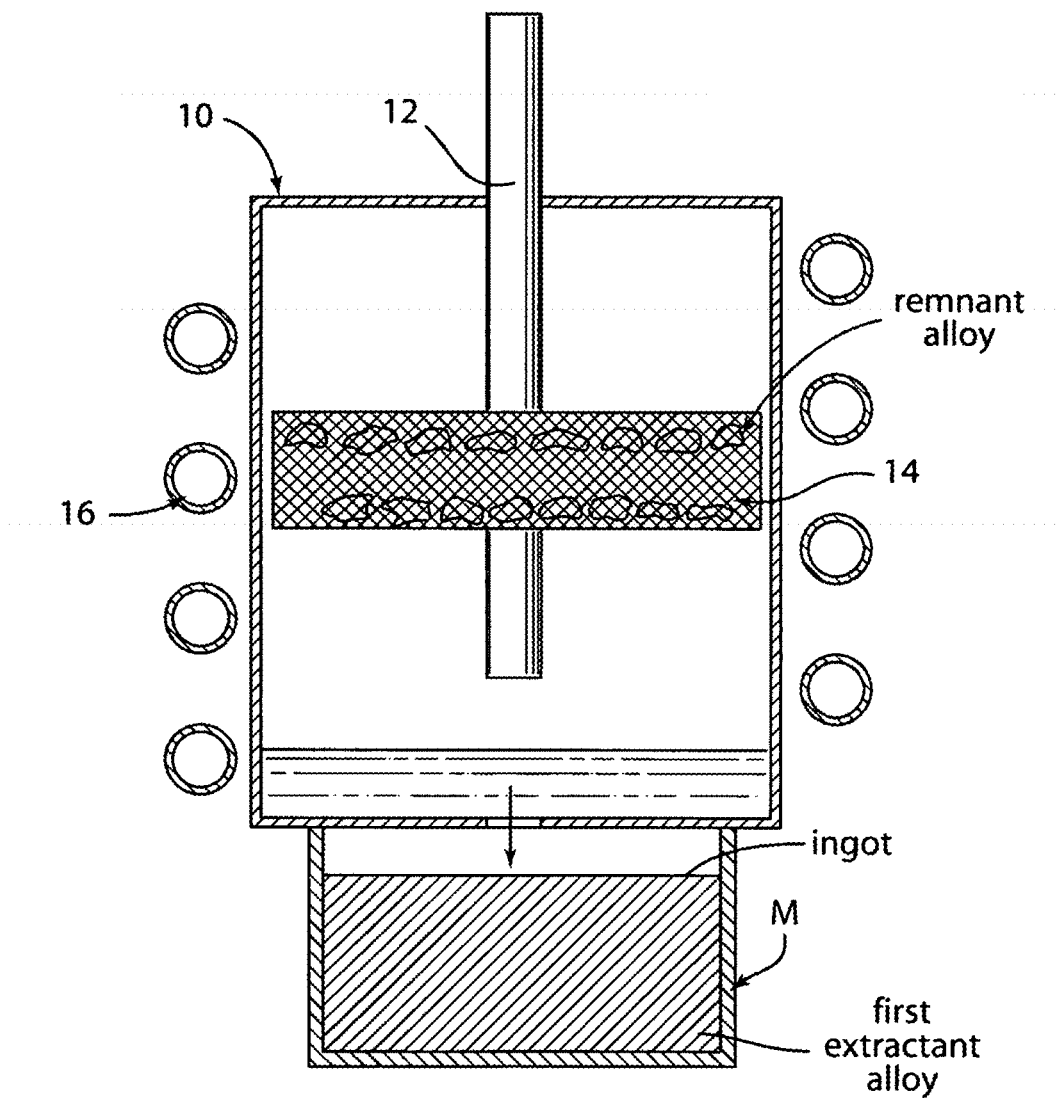

In practice of an illustrative embodiment of the present invention, the rare earth metal-bearing scrap material is treated by liquid metal extraction in a processing vessel 10 (e.g. an induction heated crucible having stopper rod 12 in FIG. 1A) to selectively extract the light rare earth metal(s) from solid scrap material (e.g. scrap pieces P in FIG. 1A) into the liquid metal extractant (e.g. liquid Mg in FIG. 1A). Selective extraction is achieved by controlling the treatment temperature (temperature of molten extractant) to be a temperature where the light rare earth metal(s) exhibit(s) relatively rapid solid state diffusion out of the scrap material and relatively high solubility in the extractant than the heavy rare earth metal. In an illustrative embodiment, the treatment temperature is controlled using an induction coil 16 disposed around the processing vessel 10, FIG. 1A, although other heating means can be used to this same end. For purposes of illustration and not limitation, the rare earth-bearing scrap particulate material is disposed in one or more stainless steel mesh boxes 14 mounted on the stopper rod 12 for movement therewith and having open mesh sides that allows the liquid extractant access to the rare earth-bearing material (pieces P, FIGS. 1A, 1B).

The first temperature is controlled to be below the melting point (liquidus temperature) of the rare earth-bearing material. The light rare earth metal(s) dissolve(s) as a solute in the molten extractant as a solvent to form a first extractant alloy after the melt in the processing vessel is solidified, but the heavy rare earth metal(s) exhibits little or no diffusion and solubility in the extractant at such first temperature/time such that a solidified remnant alloy remains in the processing vessel after the melted Mg extractant containing the light rare earth metals is separated by being cast and solidified in a mold or other vessel. For example, the melted extractant can be poured by opening stopper rod 12 into a suitable underlying melt-receiving vessel, such as mold M, FIG. 1B, for solidification to a desired shape. The cast and solidified extractant contains the vast majority of the light earth metals present in the magnet scrap. The cast and solidified first extractant alloy is subjected to vacuum distillation or sublimation to recover the light rare earth metals as a result of selective removal of the extractant (e.g. Mg).

The remnant alloy left in the processing vessel typically is based on (having a majority of) the transition metal of the scrap (e.g. Fe based) and includes the heavy rare earth metal(s). The remanant alloy can include some interparticle alloy containing the extractant (e.g. Mg) and minor amount of residual light rare earth metal(s), see FIGS. 2A, 2B, 2C. The heavy rare earth metal-containing remnant alloy can be subjected to vacuum distillation or sublimation to remove the interparticle extractant (e.g. Mg) and then to magnetic separation to separate from the residual light rare earth metals.

Or, optionally, pursuant to another embodiment of the invention, the heavy rare earth-enriched remnant alloy is contacted in a processing vessel with additional melted extractant at a second higher controlled temperature vessel where the heavy rare earth metal(s) exhibits more diffusivity out of the scrap material (pieces P) and solubility in the molten extractant to separate and recover the heavy rare earth metal(s) as a second extractant alloy (e.g. Dy/Mg alloy) when the melt is solidified. Then, the second extractant alloy can be subjected to vacuum sublimation or vacuum distillation to remove the Mg or other extractant to yield a heavy rare earth-based alloy (e.g. a Dy based alloy having a majority of Dy with minor Mg) for recycling and reuse in permanent magnet manufacture.

For convenience and energy efficiency in practicing the above embodiments of the invention, the rare earth metal-bearing scrap material and the melted magnesium extractant are disposed, and contacted in a common melting vessel 10, such as a metallic (e.g. steel) or ceramic crucible under relative vacuum (e.g. 10 torr or other value) or inert gas (e.g. argon). However, the invention is not so limited and can be practiced, for example, by melting the extractant in a separate vessel and then contacting the scrap material and the melted extractant in a separate vessel or in one of the melting vessels.

Vacuum sublimation can be conducted in a conventional distillation apparatus of suitable material (i.e. Ta, Fe, Mo, W, etc.) wherein the solidified first extractant alloy or the second extractant alloy, as the case may be, is heated and melted (or the already molten melt) is subjected to a vacuum level effective to evaporate the lower vapor pressure metal (e.g. magnesium extractant) so as to leave the higher vapor pressure metal (e.g. rare earth(s) dissolved in the extractant) for reuse. Vacuum distillation can be conducted in a conventional distillation apparatus wherein the solidified melt is heated and melted (or the already molten melt) is subjected to elevated temperature effective to evaporate the lower melting point metal (e.g. magnesium extractant) so as to leave the higher melting point metal (e.g. rare earth(s) dissolved in the extractant) for reuse.

An exemplary embodiment of the invention offered for purposes of illustration and not limitation involves contacting the rare earth metal-bearing scrap material, such as $RE_2Fe_{14}B$ scrap that contains various amounts of Nd, Pr, and Dy, and a molten distilled magnesium metal extractant in a common induction heated, melting vessel 10 (crucible) at controlled temperature greater than 650 degrees C. (melting temperature of Mg) but less than about 900 degrees C. The controlled temperature is selected to be a temperature where the Nd and Pr light rare earth metals diffuse rapidly into and are soluble in the molten magnesium extractant, but the Dy heavy rare earth metal exhibits little or no diffusion into or solubility in the molten magnesium extractant. The scrap material and melted magnesium extractant are contacted in the processing vessel at a first controlled temperature (e.g. 850 degrees C.) and time (1 hour) sufficient to selectively extract the light rare earth metal(s) from the scrap material into the melted magnesium extractant. The resulting melted extractant containing the vast majority of Nd and Pr can be cast into mold M with subsequent solidification in the mold yielding the first extractant alloy.

The heavy rare earth metal-enriched iron alloy (remnant alloy) remains in the processing vessel. The remnant alloy left in the processing vessel typically is based on (having a majority of) the transition metal of the scrap (e.g. Fe based) and includes the heavy rare earth metal(s). The remanant alloy can include some inter-particle alloy containing the extractant (e.g. Mg and minor amount of residual Nd and Pr). The heavy rare earth metal-containing remnant alloy can be subjected to vacuum distillation or sublimation to remove the inter-particle extractant (e.g. Mg) and then to magnetic separation to separate from the residual Nd and Pr light rare earth metals.

In practicing another embodiment of the invention, the iron-based remnant alloy is contacted in the same or different processing vessel 10 with molten distilled magnesium metal extractant at a higher controlled temperature greater than about 900 degrees C. (i.e. nearer the liquidus temperature of the scrap material under relative vacuum or inert gas for a time to form a second extractant alloy containing the heavy rare earth metal(s) and magnesium. The second higher temperature is selected and controlled to be a temperature (e.g. 950-1000 degrees C.) for a time (e.g. 1 hour) where the heavy rare earth metal(s) diffuse(s) more rapidly out of the scrap material and is/are more soluble in the molten extractant to separate and recover the heavy rare earth metal(s) as a second extractant alloy (e.g. Dy—Mg alloy). Subsequent pouring and solidification of the melted extractant in a mold yields the heavy rare earth metal-enriched magnesium alloy (second extractant alloy).

The second extractant alloy can be treated by vacuum sublimation or distillation to separate the lower vapor pressure magnesium metal extractant from the higher vapor pressure heavy rare earth metal to yield a heavy rare-based alloy, such as a Dy based alloy containing a majority of Dy and a minor amount of Mg, for reuse and recyling. The used extractant can be recycled in the recovery process to treat additional rare earth-bearing scrap, waste or other material.

The following Example is offered to further illustrate but not limit the present invention.

EXAMPLE I

Scrap pieces of a Dy-rich permanent magnet scrap (e.g. Grade N35 Nd2Fe14B) was used and comprised 0.39% Al, 0.91% B, 4.46% Dy, 65.1% Fe, less than 0.001% Mg, 18.03% Nd, 0.007% Ni, 6.01% Pr, where % are weight percents.

Treatment of the scrap material was conducted in relative vacuum at a treatment temperature of 850 degrees C. For each test, two hundred (200) grams of the scrap alloy in 2-4 mm pieces were placed in a mesh screen box of the type shown in FIGS. 1A, 1B and disposed on the stopper rod or other support post. The mesh screen box was lowered into a cylindrical stainless steel crucible having a height of 5.25 inches and a diameter of 3.5 inches. Two hundred (200) grams of 99.5% pure magnesium was placed in the crucible. The crucible was placed in an induction coil, which was energized to melt the magnesium extractant and provide the above controlled treatment temperature of 850 degrees C. where the light rare earth metals, Nd and Pr, diffuse rapidly out of the scrap into the liquid magnesium extractant but where the heavy rare earth metal Dy exhibits little or no diffusion into the extractant and thus little or no solublity in the extractant. The temperature was maintained for 1 hour. Then, the induction coil was de-energized and the resulting melted Mg extractant containing the vast majority of Nd and Pr of the scrap was cast by opening a stopper rod 12 into a water-cooled copper mold M where it was solidified as an ingot under an argon environment.

Remaining in the mesh screen box was an iron remnant alloy enriched in the Dy content of the scrap.

Figure 2A:
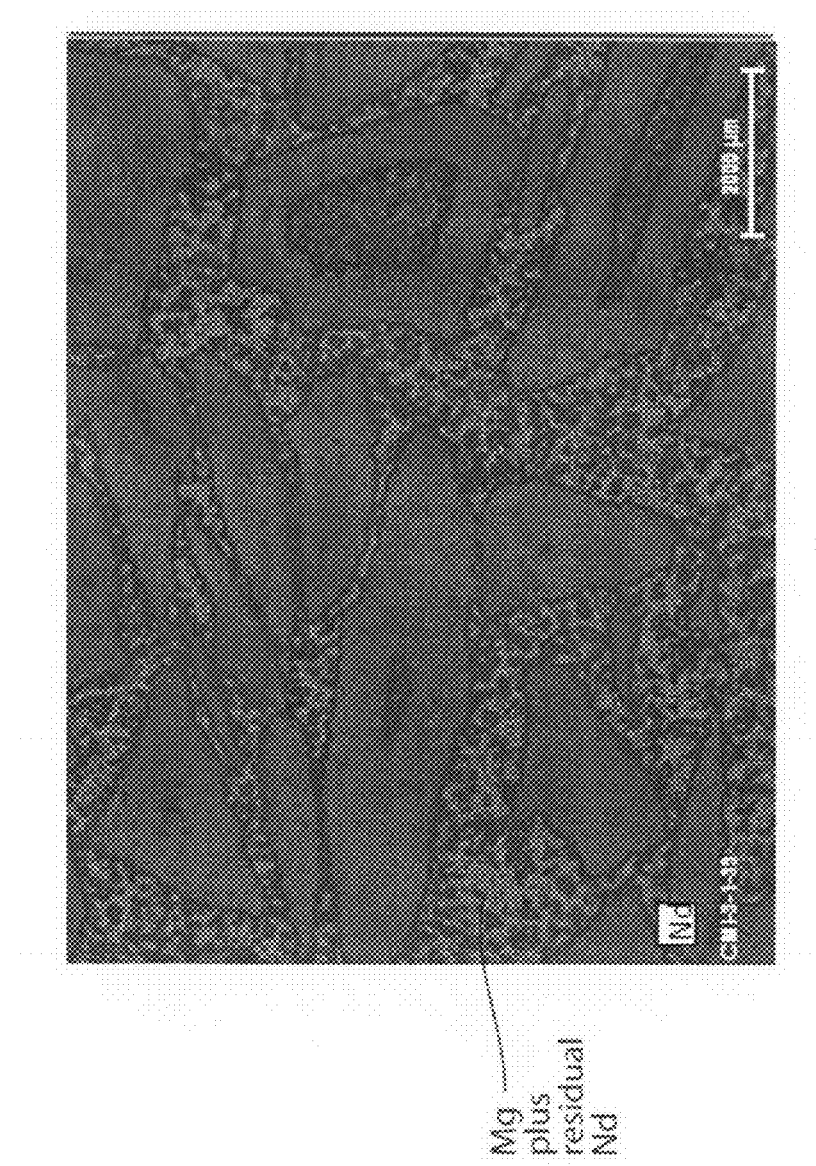
Figure 2B:
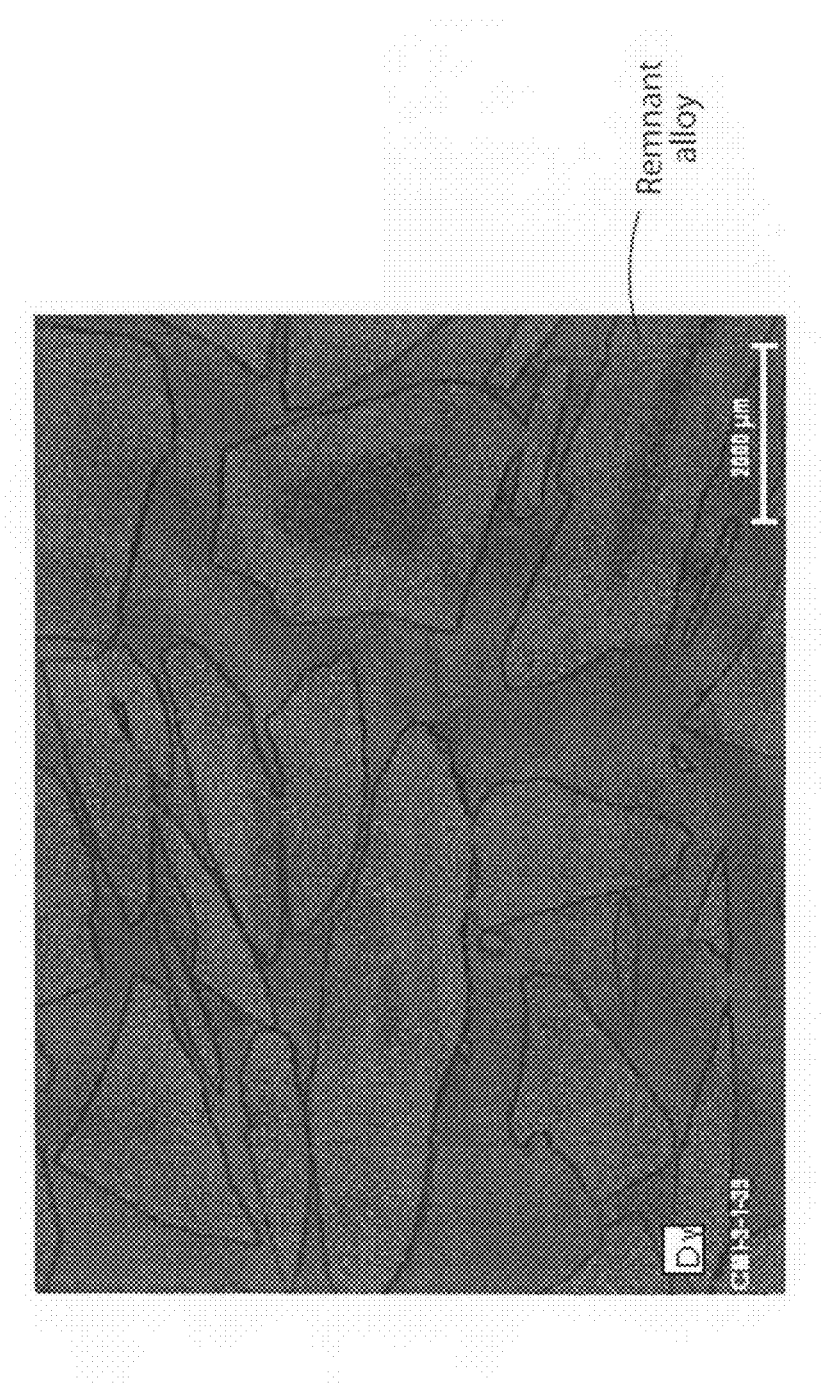

FIGS. 2A, 2B, 2C illustrates X-ray spectrometer micrographs of microstructures of the iron remnant alloy. FIG. 2A shows that an alloy containing Mg extractant and residual Nd (and Pr) occupied inter-particle spaces between bodies of the iron remnant alloy enriched in Dy as shown in FIGS. 2B, 2C.

The ingot can be subjected to vacuum distillation (e.g. at 700 degrees C. for 48 hours) to remove the Mg extractant and recover the Nd and Pr content. The remnant alloy can be subjected to similar vacuum distillation to remove the Mg extractant from the interparticle spaces, recovering the Dy-enriched iron remnant alloy with minor amounts of residual Nd and Pr on the bodies. The Dy-enriched iron remnant alloy can be separated by magnetic separation from the residual light rare earth metals (Nd and Pr).

The heavy rare earth metal (Dy) can be separated from the Dy-enriched iron remnant alloy by an additional liquid metal extraction step followed by vacuum distillation of the resulting extractant as described above.

While the invention has been described in terms of specific embodiments thereof, it is not intended to be limited thereto but rather only to the extent set forth in the following claims.

We claim:

1. A method of treating a rare earth metal-bearing material comprising a transition metal, a light rare earth metal, and a heavy rare earth metal, comprising contacting the rare earth-bearing material and a melted extractant at a treatment temperature where the light rare earth metal selectively dissolves in the melted extractant as compared to the heavy rare earth metal whereby the light rare earth metal is selectively extracted from the rare earth-bearing material into said melted extractant, separating the resulting melted extractant enriched in said light rare earth metal to provide a first extractant alloy, and leaving a remnant alloy comprising the transition metal and the heavy rare earth metal.

2. The method of claim 1 wherein the transition metal is selected from the group consisting of Fe, Co, and Ni.

3. The method of claim 1 wherein the light rare earth metal is selected from the group consisting of Nd, Pr, and Gd.

4. The method of claim 1 wherein the heavy rare earth metal is selected from the group consisting of Dy, Tb, and Ho.

5. The method of claim 1 wherein the extractant is selected from a Group IIA metal.

6. The method of claim 1 wherein the first temperature is greater than 650 C and less than 900 degrees C. and the extractant comprise magnesium.

7. The method of claim 1 further including separating the light rare earth metal from the first extractant alloy.

8. The method of claim 7 wherein the light rare earth metal is separated from the first extractant alloy by at least one of sublimation and distillation.

9. The method of claim 1 wherein said rare earth-bearing material and said melted extractant are contacted in a curciuble.

10. The method of claim 1 including the further step of contacting the remnant alloy and a melted extractant at a second temperature higher than the first temperature where the heavy rare earth metal is soluble in the melted extractant to form a second extractant alloy.

11. The method of claim 10 including separating the heavy rare earth metal from the second extractant alloy by vacuum distillation or sublimation.

12. A method of treating a rare earth metal-bearing scrap material comprising a Fe, a light rare earth metal selected from the group consisting of Nd, Pr and Gd, and a heavy rare earth metal selected from the group consisting of Dy, Tb and Ho, comprising contacting the rare earth-bearing material and a melted magnesium extractant at a treatment temperature of greater than about 650 C and less than 900 C where the light rare earth metal selectively dissolves into the melted extractant as compared to the heavy rare earth metal whereby the light rare earth metal is selectively extracted from the rare earth-bearing material into said melted magnesium extractant, separating the resulting melted extractant enriched in said light rare earth metal to provide a first extractant alloy, and leaving a remnant alloy comprising iron and the heavy rare earth metal.

13. The method of claim 12 further including separating the light rare earth metal from the first extractant alloy.

14. The method of claim 13 wherein the light rare earth metal is separated from the first extractant alloy by at least one of sublimation and distillation.

15. The method of claim 12 wherein said rare earth-bearing material and said extractant are contacted in a crucible.

16. The method of claim 12 including further step of contacting the remnant alloy and a melted magnesium extractant at a second temperature higher than the first temperature where the heavy rare earth metal dissolves into the melted magnesium extractant to form a second extractant alloy.

17. The method of claim 16 including separating the heavy rare earth metal from the second extractant alloy to form a heavy rare earth-based alloy.

* * * * *